(12) United States Patent
Deuter et al.

(10) Patent No.: US 9,892,624 B2
(45) Date of Patent: Feb. 13, 2018

(54) PORTABLE DEVICE

(71) Applicant: ZF Friedrichshafen AG, Friedrichshafen (DE)

(72) Inventors: Gerhard Deuter, Tettnang (DE); Malgorzata Wiklinska, Markdorf (DE); Matthias Holzer, Frickingen (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 0 days.

(21) Appl. No.: 15/287,910

(22) Filed: Oct. 7, 2016

(65) Prior Publication Data

US 2017/0103640 A1 Apr. 13, 2017

(30) Foreign Application Priority Data

Oct. 8, 2015 (DE) .................. 10 2015 219 511

(51) Int. Cl.
*G08B 25/01* (2006.01)
*G08B 25/12* (2006.01)
(Continued)

(52) U.S. Cl.
CPC .......... *G08B 25/016* (2013.01); *B60Q 1/525* (2013.01); *G08B 25/12* (2013.01); *B60Q 5/006* (2013.01);
(Continued)

(58) Field of Classification Search
None
See application file for complete search history.

(56) References Cited

U.S. PATENT DOCUMENTS 8,620,549 B2 12/2013 Nickolaou et al.
9,049,583 B2 * 6/2015 Kolodziej ............. H04W 4/023
(Continued)

FOREIGN PATENT DOCUMENTS

DE 20 2005 001 156 U1 5/2005
DE 10 2008 030 550 A1 1/2010
(Continued)

OTHER PUBLICATIONS

See German Action Corresponding to 10 2015 219 511.2 dated Apr. 5, 2016.

*Primary Examiner* — Leon-Viet Nguyen
(74) *Attorney, Agent, or Firm* — Davis & Bujold, PLLC; Michael J. Bujold (57) ABSTRACT

A portable device for increasing road traffic safety, detecting emergencies and emitting an alarm call for a person. The portable device includes a communication device, a position-determining system, an evaluation unit and a vibration generator. The portable device communicates, by way of the communication device, with at least one further communication device of at least one external system. The person is warned by the vibration generator of a dangerous situation determined by the evaluation unit in combination with the position-determining system and the communication device. The dangerous situation is a collision of the person wearing the portable device with the at least one external system that includes the at least one further communication device. This collision is determined by way of a behavior prediction algorithm. When the, or a further dangerous situation arises, the portable device emits an alarm call by way of the communication device.

15 Claims, 4 Drawing Sheets

(51) Int. Cl.
    *B60Q 1/52*      (2006.01)
    *B60R 21/0134*   (2006.01)
    *B60Q 5/00*      (2006.01)
    *B60W 30/08*     (2012.01)
    *B60Q 9/00*      (2006.01)
    *G08G 1/005*     (2006.01)

(52) U.S. Cl.
    CPC .......... *B60Q 9/008* (2013.01); *B60R 21/0134* (2013.01); *B60W 30/08* (2013.01); *G08G 1/005* (2013.01)

(56)  References Cited

U.S. PATENT DOCUMENTS

| | | | |
|---|---|---|---|
| 2005/0073438 A1* | 4/2005 | Rodgers | G08G 1/166 340/944 |
| 2005/0246100 A1 | 11/2005 | Nath et al. | |
| 2012/0123277 A1 | 5/2012 | Blaha et al. | |
| 2012/0223833 A1 | 9/2012 | Thomas et al. | |
| 2014/0106719 A1* | 4/2014 | Chitre | H04W 76/007 455/414.1 |
| 2014/0372561 A1* | 12/2014 | Hisano | G08G 1/0112 709/217 |
| 2015/0034396 A1* | 2/2015 | Tchertkov | H04M 1/72522 177/1 |
| 2015/0035685 A1 | 2/2015 | Strickland et al. | |
| 2016/0044276 A1* | 2/2016 | Shearman | A42B 3/0426 348/207.1 |
| 2016/0167578 A1* | 6/2016 | Park | G08G 1/16 340/435 |

FOREIGN PATENT DOCUMENTS

| | | |
|---|---|---|
| DE | 10 2009 019 767 A1 | 11/2010 |
| DE | 10 2009 035 072 A1 | 2/2011 |
| DE | 20 2010 008 948 U1 | 3/2011 |
| DE | 10 2010 001 869 A1 | 8/2011 |
| DE | 10 2011 082 325 A1 | 3/2012 |
| DE | 10 2011 004 099 A1 | 8/2012 |
| DE | 10 2012 206 522 A1 | 10/2013 |
| DE | 10 2012 210 202 A1 | 12/2013 |
| DE | 10 2014 219 148 A1 | 3/2016 |
| EP | 1 974 662 A1 | 10/2008 |
| EP | 2 403 407 A1 | 1/2012 |
| WO | 2011/116406 A2 | 9/2011 |

* cited by examiner

PORTABLE DEVICE

This application claims priority from German patent application serial no. 10 2015 219 511.2 filed Oct. 8, 2015.

FIELD OF THE INVENTION

The present invention concerns a portable device for increasing road traffic safety, for the detection of emergencies and for the emission of emergency calls for a person.

BACKGROUND OF THE INVENTION

Portable devices, in particular the so-termed wearables, have many uses. In the fitness or health sector they monitor vital functions, while in the communication sector they serve for retrieving news reports or displaying maps. Notwithstanding their different versions, they have in common that they can be connected to a network and can exchange data with other units such as PCs, other portable devices or mobile terminals, and that they are carried around on the body.

From DE 102008030550 A1 a method is known for warning road users of conflict situations in road traffic, in particular at intersections of the road network. A portable terminal emits a warning message to the road user.

From DE 102012210202 A1 a method is known for warning of an impending collision between a more maneuverable road user and a less maneuverable road user. In this case a portable terminal implements the method.

From EP 1974662 A1 a method for recognizing that a person has fallen is known, in which when a fall is detected an alarm is emitted by a device. The device is worn on the body of the person being monitored.

From DE 102009035072 A1 a method is known for predicting the position or range in which an object or a vulnerable road user, for example a pedestrian, is present, and/or the movement thereof, relative to a vehicle.

From US 20050246100 A1 a collision warning system and a method for warning a pedestrian before a collision are know.

From DE 102012206522 A1 a device is known for indicating the approach of an electric vehicle, in particular an electrically driven passenger car or utility vehicle, in order to reduce the risk of an accident to pedestrians due to the approaching electric vehicle.

From DE 102010001869 A1 a method and a device are known for warning a pedestrian of approaching vehicles that may pose a risk of collision for the pedestrian.

From DE 202005001156 U1 a portable monitoring device for the monitoring of vital functions is known.

From DE 202010008948 U1 an alarm call wristwatch is known, which emits an alarm call when a switch is actuated.

From EP 2403407 A1 a method is known for detecting an unusual situation, for example if a person has fallen.

From WO 11116406 A2 a method for verifying that a person has fallen is known.

From DE 102011004099 A2 an emergency signal device for older or disabled persons is known, which can detect and verify a fall.

From DE 102009019767 A1 a device and method for recognizing a fall are known.

From DE 102011082325 A1 a vehicle safety system is known.

In addition fall sensors are known, for example from the publications of the Westphalian University, which for example can be worn on the wrist by the elderly and which, if a fall is detected, emit an alarm call automatically or at the touch of a button.

SUMMARY OF THE INVENTION

Starting from this prior art the purpose of the present invention is to propose a portable device which not only increases the road safety of a person but can also detect emergency situations and if necessary can emit an alarm call. The portable device should also be able to communicate with external systems. In this case the portable device should be designed such that it can be carried on the body in a manner convenient for the person concerned.

With this objective in mind the present invention proposes a portable device for increasing road traffic safety, detecting emergencies and emitting alarm calls for a person, the device having the characteristics and advantageous design features as described below.

A portable device for increasing road traffic safety, detecting emergencies and emitting alarm calls for a person comprises a communication device, a position-determining system, an evaluation unit and a vibration generator. A cover element encloses the communication device, the evaluation unit and the vibration generator. The portable device communicates by way of the communication device with at least one further communication device of at least one external system. The person is warned by means of the vibration generator about a dangerous situation determined by means of the evaluation unit in combination with the position-determining system and the communication device. The dangerous situation is a collision of the person wearing the portable device with the at least one external system that comprises the at least one communication device, this collision being determined by means of a behavior prediction algorithm. By means of the communication device the portable device emits an alarm call when the, or a further dangerous situation arises.

In this case the portable device is a wearable article, for example an arm band, a necklace, a watch, a Smartwatch or some other wearable item. In other words, the portable device is carried directly by the person on the body. In this case the portable device is designed so that it is at least dust-proof and water resistant. In addition it is designed such that it can be worn conveniently by the person.

The portable device has a cover element. In other words this cover element determines the outer shape of the portable device, for example the cover element is in the form of an arm band. The cover element is preferably made of plastic but can alternatively be made of a metallic material such as aluminum or stainless steel, or of a combination of materials, for example partly of aluminum and partly of plastic. The cover element also serves as a housing for an energy supply, the communication device, the position-determining system, the vibration generator and any other systems and devices that the portable device comprises. If the portable device includes a display, this is located on the cover element.

The portable device also comprises at least one switch. The at least one switch is enclosed in part by the cover element, i.e. the at least one switch projects out of the cover element so that the person wearing the portable device can operate the at least one switch. The at least one switch can for example be a pushbutton switch. Needless to say, the portable device can comprise more than one switch. For example, the at least one switch serves for turning the portable device on and off, for activating and deactivating a standby function, for activating and deactivating the warning function and/or for activating and deactivating the alarm call.

The portable device comprises the communication device. In this case this is designed with a transmitter and a receiver. The transmitter and receiver can for example form a unit. The communication device uses one or more radio standards, such as ZigBee, Z-Wave, enOcean, KNX, W-Lan or Mobile radio.

The communication device is coupled to the evaluation unit. Data received by the communication device is evaluated by the evaluation unit and passed on to one or more systems of the portable device. Data generated by the systems of the portable device is processed by the evaluation unit and passed on to the communication device. The evaluation unit can comprise a data memory. Evaluation can for example consist of converting the data received in such manner that the systems of the portable device carry out some action. For example, when data is received from at least one external system, which data indicates that a dangerous situation is impending, the evaluation unit transforms the data so that the evaluation unit passes an activation signal on to the vibration generator, which latter then produces vibrations to warn the person wearing the portable device. When a system of the portable device, for example the position-determining system, determines a position of the portable device, that signal is converted by the evaluation unit into transmittable data which can be sent by means of the communication device to at least one external system.

By means of the position-determining system, the position of the portable device and hence the position of the person wearing the portable device can be determined. The position-determining system can also be used for location. In that case the position-determining system is a GNSS system. So long as the portable device is switched on, i.e. activated, and/or is in a standby mode, the position is determined continuously by the position-determining system. The position data is continuously stored intermediately in the data memory of the evaluation unit and/or transmitted continuously by the communication device to at least one external system and/or to a Cloud. Alternatively or in addition, the position data can be stored intermediately in the Cloud. With reference to the position data determined, which are evaluated, a conclusion can be reached about the forthcoming movement of the portable device and hence that of the person wearing the portable device. For example, a forthcoming movement detected can cause a standby mode of the portable device to be terminated.

The portable device comprises an energy supply. This is an independent energy supply, for example a battery or preferably an accumulator. The portable device can have a charge-condition indicator that shows how much energy is still available or for how long the portable device can still be supplied with energy. The indicator can be visual, acoustic or tactile, or a combination of those options. If an accumulator is used, it can be charged by means of a charging cable, inductively, or by "energy harvesting".

The portable device communicates via the communication device with at least one other communication device of at least one external system. In this context, an external system is for example another portable device which can for example have a different configuration from the first portable device, or a mobile terminal, or a vehicle with an on-board computer, or with HMI (human-machine interface) systems. Each of these external systems has a communication device of its own. Data exchange between the portable device and an external system can also take place by way of a Cloud. For example, the communication between the portable device and an HMI of a vehicle can take place either directly, or via a Cloud. In direct communication the data exchange between the portable device and the HMI of the vehicle takes place directly, with no detours. In the case of communication via the Cloud, the data exchanges between the portable device and the Cloud and between the Cloud and the HMI of the vehicle take place in each case directly and with no intermediary. Communication between the portable device and an external system can only take place when the respective communication devices are compatible with one another and are using the same or compatible radio standards. Communication via the Cloud is advantageous since several inquiries can be processed at the same time.

The person wearing the portable device is warned by the vibration generator of a dangerous situation determined by means of the evaluation unit in combination with the position-determining system and the communication device, wherein the dangerous situation is a collision of the person wearing the portable device with the external system comprising the at least one communication device and the collision is determined by means of a behavior prediction algorithm.

In this case the dangerous situation is appraised as follows: first, the portable device activated or in its standby mode sends out a so-termed "here-I-am" message. That message contains data such as GPS co-ordinates, a name or an ID, a time datum such as UTC, and possibly a speed relative to a reference co-ordinate system. If necessary the message can communicate additional data as well. If within an area around the portable device there is at least one external system, then via its own communication device this sends out a corresponding "here-I-am" message. Each "here-I-am" message is exchanged either directly between the portable device and the at least one external system, or first transmitted to the Cloud and then exchanged by way of the Cloud. The data contained in the two "here-I-am" messages are processed, either in the evaluation unit of the portable device and in an evaluation unit of the at least one external system, which for that purpose comprise a behavior prediction algorithm, or in the Cloud, which for that purpose also comprises a behavior prediction algorithm.

The result of the evaluation by the behavior prediction algorithm is a collision probability, which indicates how high is the probability of a collision between the portable device and the at least one external system. In the case of evaluation in the Cloud, the result is transmitted to the portable device, received by the communication device and passed on to the evaluation unit, where it is compared with a probability threshold value. If evaluation takes place in the evaluation unit of the portable device itself, the comparison with a probability threshold value takes place directly. If the probability has reached or exceeded a pre-established probability threshold value, the evaluation unit of the portable device sends a signal to the vibration generator. This produces vibrations which, having regard to their intensity, are designed to warn the person wearing the portable device. This warning alerts the person to an impending collision so that he can react appropriately, for example turn aside or stop. In this way road traffic safety is substantially increased.

In addition the determination of the collision probability can be supplemented by 3D map data in order to prevent unnecessary warnings. For example, if the person wearing the portable device is in a pedestrian underpass and the external system, for example built into a vehicle, is on a street crossing over that underpass, an unnecessary warning could be produced. If 3D map data are compared with the position data and on the 3D map a structural change is indicated which precludes a collision of the person with the external system, no warning is necessary.

In addition the determination of the collision probability can be supplemented by other data. For example, speed data and direction data of the portable device and/or the external system can be taken into account in calculating the collision probability. Specific data about the external system can also be taken into account in calculating the collision probability. Specific data about the external system are, for example, data about a vehicle type, i.e. whether it is a passenger car, a truck, a motorcycle, a bicycle or some other type, and/or about the size of the vehicle. Information about whether the vehicle is automatically driven can also be taken into account in calculating the collision probability. Inclusion of the specific vehicle data is advantageous, since in that way data about braking behavior, acceleration behavior and/or collision area are taken into account in calculating the collision probability.

By means of the communication device the portable device emits an alarm call if the dangerous situation, or any further dangerous situation, arises. If despite the warning the dangerous situation cannot be averted, or if another dangerous situation arises for the person wearing the portable device, this is recognized by the portable device and verified. The portable device emits an alarm call automatically, for example to a rescue control center or to persons stored in an emergency contact list. Alternatively or in addition, the alarm call can be emitted by actuating the at least one switch. If there is no reaction from the first person on the emergency contact list, the second person is notified. If in turn this person too fails to react, the third person is notified, and so on. If the emergency contact list has been exhausted and none of the emergency contacts has reacted, the rescue control center is notified. The alarm call can be either an automated call or a text message. The other dangerous situations may be, for example, unusual vital data or a fall of the person wearing the portable device.

In one embodiment the vibration generator is a vibration motor. In this case the vibration motor is of commonly available design.

In another embodiment the portable device comprises at least one loudspeaker, and the vibration generator is the loudspeaker. In this case a vibration is generated by intentional erroneous operation of the loudspeaker. In this case again, the loudspeaker is of commonly available design.

In a further embodiment the duration of a vibration generated by the vibration generator is a measure of the probability that a dangerous situation will occur. In this case the vibration duration can be scaled linearly. The formula Vibration duration=Collision probability*Number of seconds determined can be used. For example, a fixed number of collision probability intervals can be defined. The dormant period between the vibration intervals can be a measure of the distance between the person wearing the portable device and the external system. The formula Dormant period=((Distance in meters/10 m)−1) s can be used. For example, a fixed number of distance intervals can be defined. If several external systems are involved, only the collision most imminent in time or most imminent in space with the person wearing the portable device can be taken into account.

In a further embodiment the portable device comprises at least one switch and the alarm call is triggered by actuating the at least one switch. In this case a time period can be defined, for which the switch must remain actuated or pressed in order then for an alarm call to be emitted. That time period must be long enough to differ from an inadvertent actuation or a deactivation of the standby function. For example, the switch might have to be actuated for a minimum of 3 seconds.

According to another embodiment, the portable device comprises at least one vitality sensor which determines at least one vital sign of the person wearing the portable device, such that the further dangerous situation occurs if the vital sign reaches or exceeds a vital sign threshold, whereby the alarm call is triggered. In this case the at least one vitality sensor is of commonly available design and is enclosed within the cover element, in such manner that for example a measurement point of the vitality sensor can project out of the cover element. The vitality sensor can be used in combination with an acceleration sensor and/or a movement sensor. A vital sign of a person is for example a pulse rate, a blood oxygen saturation level, an activity of the person, a body temperature of the person, or other suitable values. Needless to say, the portable device can comprise more than one vitality sensor and can therefore monitor several vital signs of the person wearing the portable device. For example, a vitality sensor can be used which determines several vital signs.

In this context, the further dangerous situation can for example be a very low pulse rate in combination with a low blood oxygen level. A vital threshold, for example, has to be determined individually for every person wearing the portable device, or taken from a databank with comparable values for the corresponding age group, sex and other corresponding characteristics of the person wearing the portable device. This databank can be stored in the Cloud or in the data memory of the evaluation unit. The vital signs determined by the vitality sensor can be taken into account for verifying the dangerous situation, i.e. the collision.

In a further embodiment the portable device comprises at least one acceleration sensor which determines an acceleration of the person wearing the portable device. In this case the dangerous situation arises if the acceleration reaches or exceeds an acceleration threshold value, whereupon the alarm call is triggered. The acceleration sensor can be used in combination with the vitality sensor and/or a movement sensor. In this context the acceleration sensor is of commonly available design and is enclosed by the cover element. The at least one acceleration sensor determines acceleration values of the portable device and hence of the person wearing the portable device.

In this case the dangerous situation can for example be a very high acceleration, one that is outside the normal range. Here, it can be appropriate to store normal acceleration values as a basis for comparison in the Cloud or in the data memory of the evaluation unit. For example, normal acceleration values for various situations can be stored, such as acceleration values for cycling, jogging, walking, driving an automobile, etc. This avoids unnecessary alarm calls. For example, if "walking" has been set or detected by means of the acceleration sensor or some other sensor, and if the acceleration rises briefly above a certain acceleration threshold value and then falls to zero, a further dangerous situation such as a fall may have taken place and an alarm call is triggered. To verify this, for example values from other sensors such as the vitality sensors can be taken into account. For, if the vitality sensors detect no pulse but the skin resistance is normal and the acceleration sensor detects an unusual acceleration, a further dangerous situation may exist and an alarm call is triggered. The acceleration values determined by the acceleration sensor can be taken into account for verifying the dangerous situation, i.e. the collision.

According to another embodiment the portable device comprises at least one movement sensor which determines movement of the person wearing the portable device; the further dangerous situation exists if the movement reaches or exceeds a movement threshold value, whereupon the alarm call is triggered. The movement sensor can be used in combination with the vitality sensor and/or the acceleration sensor. In this case the at least one movement sensor is of commonly available design, and is enclosed by the cover element. The at least one movement sensor determines movement values of the portable device and hence the person wearing the portable device. Such movement values are for example steps of the person counted by the portable device, or speed values.

In this context the further dangerous situation could be, for example, a very high speed outside the normal range. Here, it can be appropriate to store normal movement values as a basis for comparison in the Cloud or in the data memory of the evaluation unit. For example, normal movement values can be stored for various situations, such as acceleration values for cycling, jogging, walking, driving an automobile, etc. This avoids unnecessary alarm calls. For example, if "walking" has been set or detected by means of the movement sensor or some other sensor, and if the speed increases briefly to above a certain speed threshold value and then falls to zero, a further dangerous situation such as a fall may have taken place and an alarm call is triggered. The movement values determined by the movement sensor can be taken into account for verifying the dangerous situation, i.e. the collision.

According to a further embodiment the alarm call is suppressed by an inhibiting action carried out by the person concerned. This is necessary, for example, if by means of a sensor or a system of the portable device the occurrence of a dangerous situation or a further dangerous situation has been detected, whereas none has in fact arisen. For example the person with the portable device may have bumped into some object, such as a door, or inadvertently dropped the portable device so that it sustains an impact. This can be evaluated by the portable device as a fall or collision, which would then trigger an alarm call. To prevent that, the person can for example operate the switch for a certain amount of time, for example by pressing it. If that is done the emission of an alarm call is suppressed or an "all-clear" signal is sent by means of the communication device to the receiver of the distress call.

In a further embodiment the portable device comprises a light source, which is controlled by noting the time of day and/or by means of a brightness sensor in the portable device. The light function increases the visibility of the person wearing the portable device in dark surroundings, thereby increasing road safety. The light source can be for example a light-emitting diode or a display illumination. The light source is attached to the cover element so that it can emit light to the surroundings.

For example, the light source is controlled by noting the time of day. This means that the light source is activated after a time query. The time query can for example be linked to a date query. Thus, as soon as a time classified as evening or night is recognized, the light source is activated. This can differ according to the time of year. Alternatively or in addition the light source can be controlled with reference to a brightness sensor. If the brightness sensor detects brightness levels below a certain brightness threshold value, which is stored in the data memory of the evaluation unit or in the Cloud, the light source is activated.

Of course, the brightness sensor can be combined with the time query, in such manner that their values can be compared with one another to assess their plausibility. For example, if the time of day is classified as night but the brightness sensor detects sufficient light intensity, then the light source is not activated. Or if the brightness sensor detects too low a light intensity but the time of day is not classified as night, again the light source is not activated. Of course, the light source can also be activated or deactivated manually, for example by actuating the at least one switch.

In a further embodiment the data received by the communication device or the data determined by the brightness sensor, the acceleration sensor, the at least one vitality sensor or by the movement sensor are processed in the evaluation unit. For that purpose the evaluation unit comprises an artificial intelligence system as well as sufficient computing and storage capacity.

In another embodiment the data received by the communication device or the data determined by the brightness sensor, the acceleration sensor, the at least one vitality sensor or by the movement sensor are processed in a Cloud. The Cloud communicates with the portable device by way of the communication device.

BRIEF DESCRIPTION OF THE DRAWINGS

Various example embodiments and details of the invention are described in more detail with reference to the figures explained below, which show.

DETAILED DESCRIPTION OF THE PREFERRED EMBODIMENTS

Figure 1:
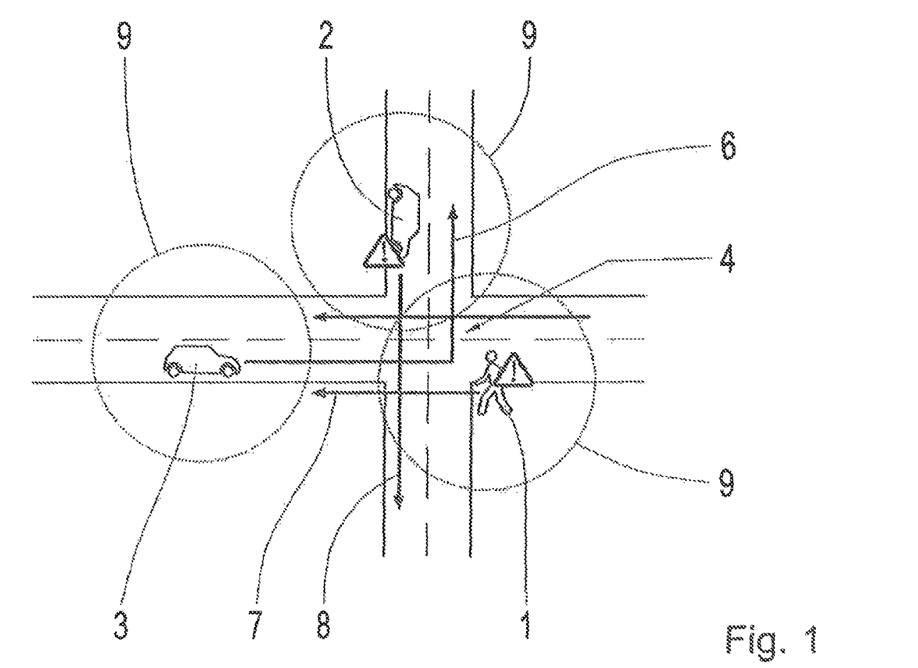
FIG. 1: A schematic overview of a traffic situation with three road users, according to an example embodiment.

FIG. 1 shows a schematic overview of a traffic situation with three road users 1, 2 and 3 according to an example embodiment. The first road user 1 is a pedestrian, the second road user 2 is a passenger car and the third road user 3 is also a passenger car. The figure shows a road junction 4. In addition a trajectory 6, 7, 8 is shown for each respective road user 1, 2, 3. A first trajectory 7 is associated with the first road user 1, a second trajectory 8 with the second road user 2 and a third trajectory 6 with the third road user 3. These trajectories 6, 7, 8 show the directions in which the road users 1, 2, 3 are moving. Furthermore, each road user 1, 2, 3 is surrounded by a circular area 9 which indicates a possible danger zone. In this context a danger zone is an area in which a possible collision between at least two of the road users 1, 2, 3 or an accident could take place.

The first road user 1 is equipped with a portable device for increasing road safety, for detecting emergencies and for emitting an alarm call. The portable device comprises, among other things, a communication device, a position-determining system, an evaluation unit and a vibration generator. The second road user 2 is also equipped with a position-determining system, an evaluation unit and a communication device. Likewise, the third road user 3 is equipped with a position-determining system, an evaluation unit and a communication device. One or both of the two passenger cars, i.e. the second road user 2 or the third road user 3, may for example be an automatically driven vehicle. The communication devices of the respective road users 1, 2, 3 can communicate with one another and exchange signals. These signals are evaluated by the respective evaluation units of the road users 1, 2, 3 in each case.

The trajectory 6 of the third road user 3 shows that he is moving from west to north. The trajectory 8 of the second road user 2 shows that he is moving from north to south. The trajectory 7 of the first road user 1 shows that he is moving from east to west. Thus, the third road user 3 does not represent any danger for the first road user 1, since they are moving apart.

This is determined in that the position-determining system of the third road user 3 determines position data which are communicated to the portable device carried by the first road user. The data from the position-determining system of the third road user 3 are evaluated by the evaluation unit in the portable device carried by the first road user 1. For that purpose, for example a behavior prediction algorithm can be used. In this case the position-determining system of the third road user 3 can be a navigation system of the passenger car, which is for example equipped with a GPS. Alternatively, the navigation system of the third road user 3 can transmit to the portable device of the first road user 1 information about the route to be followed by the third road user 3. These data are evaluated by the evaluation unit of the portable device.

In contrast, a collision could take place between the second road user 2 and the first road user 1. So that the pedestrian, who is the first road user 1, can be warned about this impending collision, the data from the position-determining system of the second road user 2 are evaluated by the evaluation unit of the portable device carried by the first road user 1. These data can come, for example, from a navigation system of the passenger car. Likewise, data concerning the movement direction and speed of the first road user 1 are evaluated by the evaluation unit. The exact position of the first road user 1 is determined by the position-determining system of the portable device. By means of a behavior prediction algorithm it is determined how probable an impending collision between the first road user 1 and the second road user 2 is. Then, the first road user 1 is warned by means of a signal, for example a vibration produced by the vibration generator.

Furthermore, the second road user 2 can also be warned of the impending collision by a warning device integrated in the passenger car, for example by means of a human-machine interface (HMI) such as a vibration of the steering wheel. The data evaluation can also include data about the speed of the vehicle or the travel speeds of the road users 1, 2, 3. Likewise, data about the "vehicle types" of the various road users 1, 2, 3 can be taken into account in the evaluation.

Figure 2:
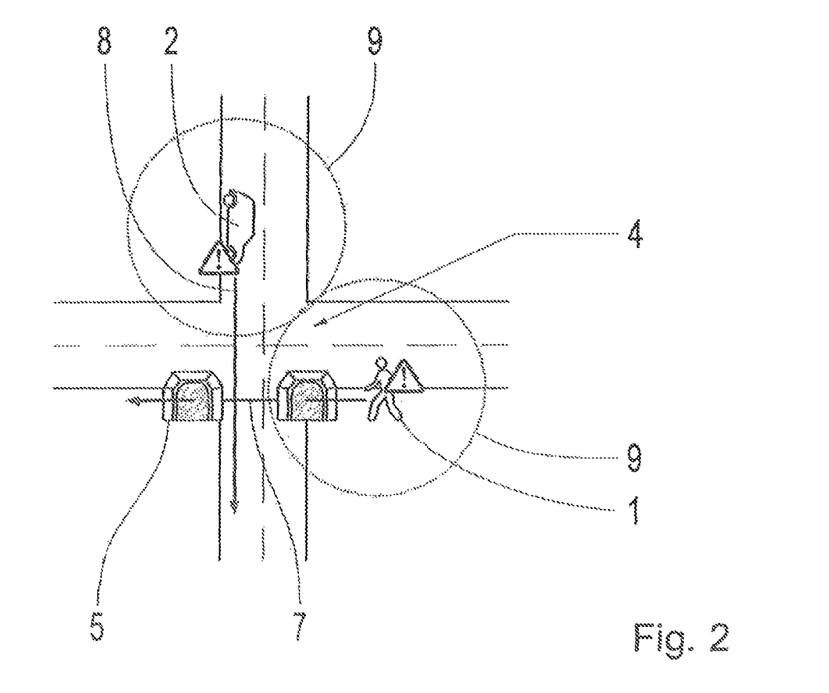
FIG. 2: A schematic overview of a traffic situation with two road users and a pedestrian underpass, according to an example embodiment.

FIG. 2 shows a schematic overview of a traffic situation with two road users 1, 2 and a pedestrian underpass 5, according to an example embodiment. In this case the first road user 1 is a pedestrian and the second road user 2 is a passenger car. The first road user 1 is on a first trajectory 7 and the second road user 2 is on a second trajectory 8. The first road user 1 is equipped with a portable device comprising a position-determining system, an evaluation unit, a communication device and a vibration generator. The second road user 2 has a position-determining system, a communication device and an evaluation unit. The second road user 2 can for example be an automatically driven vehicle.

The figure shows a road intersection 4 with a pedestrian underpass 5 running under it. The first road user 1 is moving through the pedestrian underpass 5 from east to west. The second road user 2 is driving along the road from north to south. A circular area 9 is drawn around each road user 1, 2.

The position-determining system of the second road user 2 emits signals, which are received by the communication device in the portable device carried by the first road user 1 and evaluated by its evaluation unit. In this case, the evaluation unit has recourse to data from a three-dimensional map. In addition a behavior prediction algorithm is used. Thus it can be established that the second road user 2 does not present any threat to the first road user 1 since the latter is crossing the road by way of a pedestrian underpass 5 and cannot therefore collide with the vehicle, i.e. the second road user 2, since the latter is on the road above. Accordingly, the portable device does not emit a warning to the first road user 1.

Figure 3A:
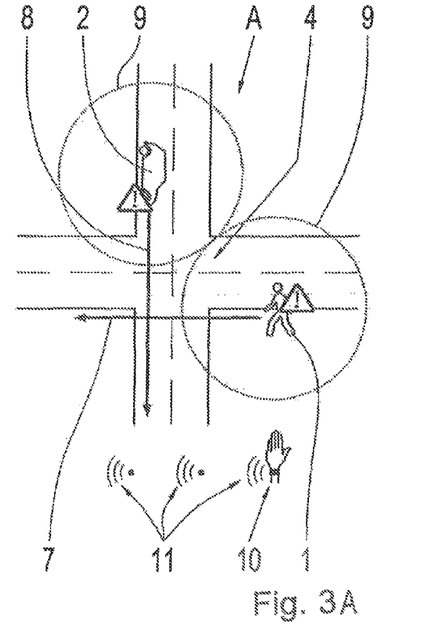
FIG. 3A: A schematic overview of a traffic situation with two road users at one time-point, according to an example embodiment.
Figure 3B:
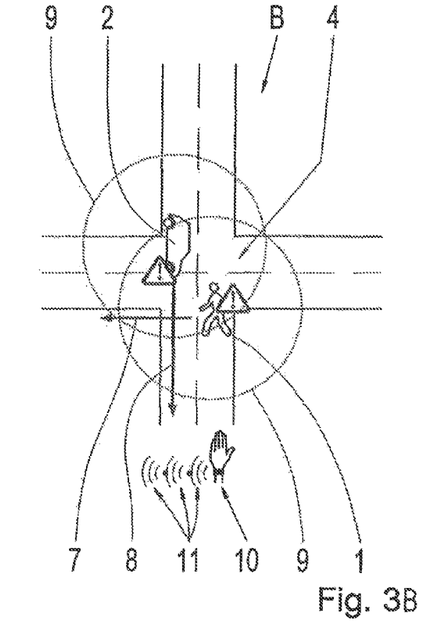
FIG. 3B: A schematic overview of a traffic situation with two road users at another time-point, according to an example embodiment.

FIGS. 3A and 3B show a schematic overview of a traffic situation with two road users 1, 2 at different time-points A, B, according to an example embodiment. Again, a road intersection 4 is shown. The first road user 1 is a pedestrian and the second road user 2 is a passenger car. The first road user 1 is moving on a first trajectory 7 and the second road user 2 on a second trajectory 8. A circular area 9 is drawn around each road user. The greater the overlap of these circular areas 9, the more probable is a collision between the two road users 1, 2, or an accident.

In addition the figure shows schematically a hand of the first road user 1, which is carrying a portable device 10 that emits vibration signals 11. These vibration signals 11 are also represented schematically. The distance shown between the vibration signals 11 from one another indicates the time interval at which the vibration signals 11 follow one another.

At the first time-point A, as shown in FIG. 3A, the first road user 1 and the second road user 2 are still far apart from one another. In other words it is not yet very probable that there will be a collision between the first road user 1 and the second road user 2. However, with the help of a behavior prediction algorithm it has already been determined by the evaluation unit of the portable device 10 that in the near future a collision could take place between the two road users 1, 2. Accordingly, the portable device 10 emits a warning signal in the form of vibration signals 11 to the first road user 1. The vibration signals 11 follow one another at large intervals, meaning that the probability of a collision between the first and second road users 1, 2 is still small.

At the second time-point B, as shown in FIG. 3B, the first road user 1 has moved along his trajectory 7 farther to the west and the second road user 2 along his trajectory farther to the south. The circular areas 9 around the two road users 1, 2 now overlap very substantially. This indicates that a collision is highly probable. From the signals it has received from the second road user 2 by way of the latter's position-determining system and communication device and with the help of a behavior prediction algorithm, the evaluation unit of the portable device 10 determines how high is the probability of a collision between the first and second road users 1, 2. Due to the higher collision probability between the first and second road users 1, 2 compared with the first time-point A, the portable device 10 emits vibration signals 11 to the first road user 1 that follow one another at close intervals. The first road user 1 can determine from the intervals between the vibration signals how far dangerous situations are from him and how probable a collision is.

For example, the vibration duration can be scaled linearly. Moreover, the pause time between the vibration intervals can be a measure of a distance between the first road user 1 and the second road user 2.

Figure 4:
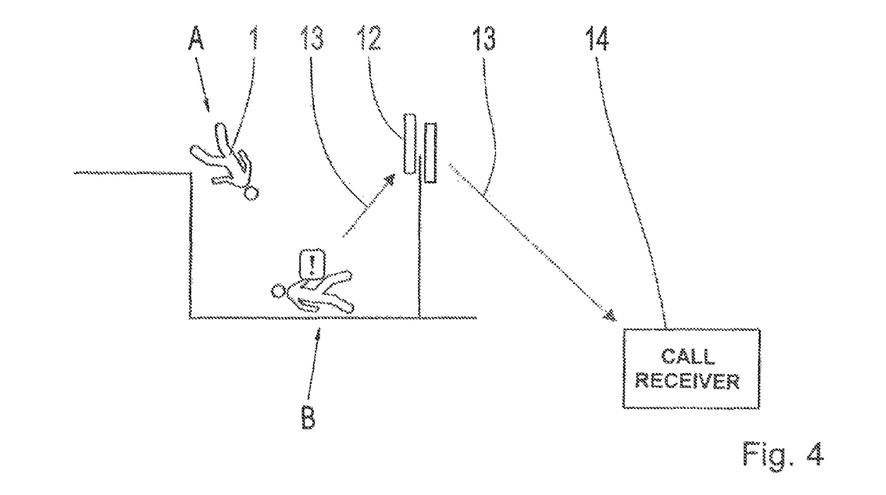
FIG. 4: A schematic representation of another dangerous situation, according to an example embodiment.

FIG. 4 shows a schematic representation of another dangerous situation, according to an example embodiment. A first road user 1 who is a pedestrian is shown. This road user 1 is shown at different points in time A, B. At time A the first road user 1 falls. At time B the road user 1 has already fallen and a dangerous situation has arisen.

The first road user 1 is wearing a portable device equipped with a position-determining system, an evaluation unit, a vibration generator and a communication device, as well as at least one switch.

A combined transmitter and receiver 12 is also shown. If the dangerous situation has occurred at the second time-point B, the first road user 1 can trigger an alarm call by means of a switch of the portable device. Alternatively, the portable device can comprise for example vital sensors or acceleration sensors or movement sensors and detect a fall independently by means of the evaluation unit and emit an alarm call automatically.

The alarm call is emitted in that by means of its communication device the portable device sends signals 13 to the combined transmitter and receiver 12, and the latter passes the alarm call on in the form of signals 13 to an alarm call receiver 14. An alarm call receiver 14 can for example be a rescue control center or one or more predetermined people.

Figure 5:
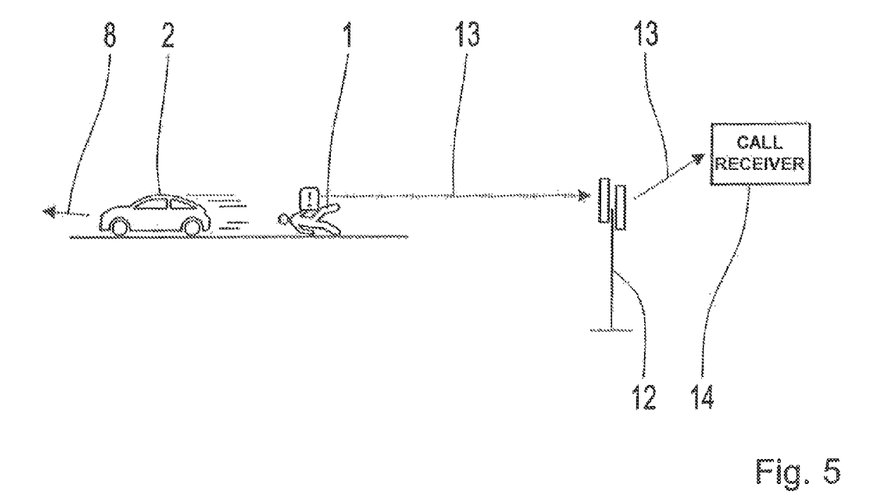
FIG. 5: A schematic representation of another dangerous situation, according to an example embodiment.

FIG. 5 shows a schematic representation of another dangerous situation, according to an example embodiment. Two road users 1, 2 are shown at the time of an accident. The first road user 1 is a pedestrian and the second road user 2 is a passenger car. The second road user is moving along a trajectory 8. At the moment shown, a collision between the first road user 1 and the second road user 2 has already taken place.

The first road user 1 is wearing a portable device equipped with a position-determining system, an evaluation unit, a vibration generator and a communication device, as well as at least one switch. The portable device worn by the first road user 1 has detected the occurrence of the dangerous situation, for example by means of vital sensors, movement sensors and/or acceleration sensors, whose signals have been evaluated by the evaluation unit. Alternatively, the first road user 1 can trigger an alarm call by means of a switch. Because of the dangerous situation detected, the portable device passes on by means of its communication device signals 13 to a combined transmitter and receiver 12, so that an alarm call is emitted. Thereafter the combined transmitter and receiver 12 sends signals 13 to an alarm call receiver 14 such as a rescue control center or one or more predetermined people.

Figure 6:
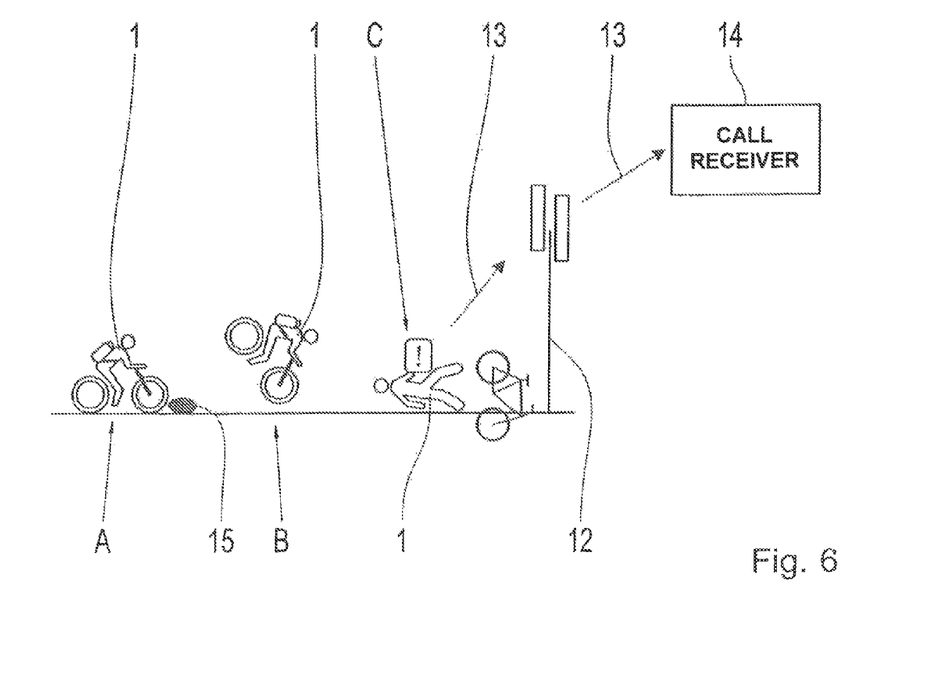
FIG. 6: A schematic representation of another dangerous situation, according to an example embodiment.

FIG. 6 shows a schematic representation of a further dangerous situation according to an example embodiment. A first road user 1 is shown, who in this case is a cyclist. The first road user 1 is shown at three different but consecutive time-points A, B, C. At the first time-point A the first road user 1 collides with an obstacle 15. At the second time-point B the first road user 1 is undergoing a fall. At the third time-point C the dangerous situation has arisen and the first road user 1 has fallen off his bicycle. The first road user 1 is wearing a portable device, equipped with a position-determining system, an evaluation unit, a vibration generator and a communication device, as well as at least one switch.

This dangerous situation or accident is detected by the portable device worn by the first road user 1. That is done for example by virtue of vital sensors, acceleration sensors or movement sensors, whose signals are evaluated by the evaluation unit of the portable device. Due to the fall detected the portable device emits an alarm call by way of its communication device. Alternatively, the first road user can emit an alarm call by means of the switch of the portable device. For this, the portable device sends signals 13 to a combined transmitter and receiver 12, which in turn sends signals 13 to an alarm call receiver 14, for example a rescue control center, or one or more predetermined people.

Figure 7:
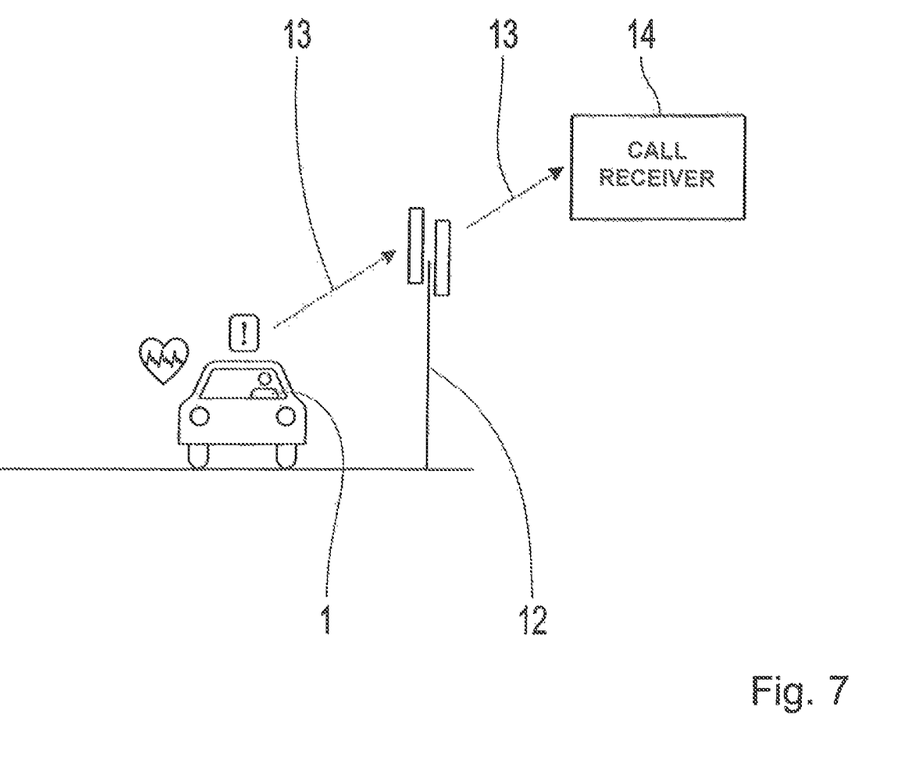
FIG. 7: A schematic representation of another dangerous situation, according to an example embodiment.

FIG. 7 shown a schematic representation of a further dangerous situation, according to an example embodiment. A first road user 1 is shown, who in this case is driving an automobile. The first road user 1 is wearing a portable device equipped a position-determining system, an evaluation unit, a vibration generator and a communication device, as well as at least one switch. In the dangerous situation shown the vital sensors in the portable device have recognized that the first road user 1 is unwell. For this, the signals determined by the vital sensors are evaluated by the evaluation unit of the portable device. By means of its communication device the portable device emits an alarm call. The portable device sends signals 13 to a combined transmitter and receiver 12. This sends signals to an alarm call receiver 14, for example a rescue control center, or one or more predetermined people.

The examples described herein have been chosen only as examples. For example, the data processing can take place either in a system integrated in the portable device or in a Cloud. For example, several road users can also be equipped with a portable device and these can each communicate with one another. Furthermore, the portable device can also have additional functions such as fitness functions. For example, road users which are vehicles can comprise HMI systems that warn the vehicle user about impending dangerous situations.

INDEXES

1 First road user
2 Second road user
3 Third road user
4 Road junction
5 Pedestrian underpass
6 Trajectory of the third road user
7 Trajectory of the first road user
8 Trajectory of the second road user
9 Circular area
10 Portable device
11 Vibration
12 Receiver and transmitter
13 Signals
14 Alarm call receiver
15 Obstacle
A First time-point
B Second time-point
C Third time-point

The invention claimed is:

1. A portable device (10) for increasing road traffic safety, detecting emergencies and emitting alarm calls for a person (1), the portable device comprising:
   a communication device,
   a position-determining system,
   an evaluation unit, and
   a vibration generator such that
   the portable device (10) communicating, via the communication device, with at least one further communication device of at least one external system,
   the person (1) being warned, by the vibration generator, of a dangerous situation determined by the evaluation unit in combination with the position-determining system and with the communication device,
   the dangerous situation being a collision of the person (1) wearing the portable device (10) with the at least one external system, which comprises the at least one further communication device,
   the collision being determined by the evaluation unit with a behavior prediction algorithm,
   the portable device emitting, via the communication device, an alarm call at an onset of the dangerous situation or of any further dangerous situation,
   the portable device further comprising at least one switch which is actuatable to trigger the alarm call, and
   at least one vitality sensor which determines at least one vital sign of the person (1) wearing the portable device (10), and the further dangerous situation arises when the at least one vital sign either reaches or exceeds a vital sign threshold, whereupon the alarm call is triggered.

2. The portable device (10) according to claim 1, wherein the vibration generator is a vibration motor.

3. The portable device (10) according to claim 1, wherein the portable device comprises at least one loudspeaker which constitutes the vibration generator.

4. The portable device (10) according to claim 1, wherein a duration of a vibration produced by the vibration generator is a measure of an occurrence probability of the dangerous situation.

5. The portable device (10) according to claim 1, wherein the portable device comprises at least one vitality sensor which determines at least one of a pulse rate, a blood oxygen saturation level, an activity of the person, and a body temperature of the person (1) wearing the portable device (10), and the further dangerous situation arises when the at least one of the pulse rate, the blood oxygen saturation level, the activity of the person, and the body temperature of the person either reaches or exceeds a corresponding threshold, whereupon the alarm call is triggered.

6. The portable device (10) according to claim 1, wherein the portable device comprises at least one acceleration sensor which determines an acceleration of the person (1) wearing the portable device (10), and the further dangerous situation exists if the acceleration either reaches or exceeds an acceleration threshold, whereupon the alarm call is triggered.

7. The portable device (10) according to claim 1, wherein the portable device comprises at least one movement sensor which determines movement of the person (1) wearing the portable device (10), and the further dangerous situation exists if the movement of the person (1) reaches or exceeds a movement threshold, whereupon the alarm call is triggered.

8. The portable device (10) according to claim 1, wherein the alarm call is suppressed by an inhibiting action carried out by the person (1).

9. The portable device (10) according to claim 1, wherein the portable device comprises a light source which is controlled with reference to at least one of a time of day and a light value detected by a brightness sensor in the portable device.

10. The portable device (10) according to claim 1, wherein data processing of data, either received via the communication device or determined by at least one of a brightness sensor, an acceleration sensor, at least one vitality sensor and by a movement sensor, takes place in the evaluation unit.

11. The portable device (10) according to claim 1, wherein data processing of data, either received via the communication device or determined by at least one of a brightness sensor, an acceleration sensor, the at least one vitality sensor or by a movement sensor, takes place in a Cloud.

12. A portable device (10) for increasing road traffic safety, detecting emergencies and emitting an alarm call for a person (1) utilizing the portable device, the portable device comprising:
   a communication device for transmitting and receiving signals so as to communicate with at least one external system;
   a position-determining system for determining a current location of the person (1) utilizing the portable device, and the position-determining system transmitting a current location data of the person utilizing the portable device;
   an evaluation unit for receiving and evaluating the signals received from the communication device and the location data received from the position-determining system to detect a dangerous situation, and the evaluation unit having a behavior prediction algorithm which facilitates detection of the dangerous situation, the evaluation unit of the mobile device also comparing the location data with three dimensional map data for the detection of the dangerous situation;
   a vibration generator being actuated by the evaluation unit for emitting an alarm call when a dangerous situation is detected by the evaluation unit so as to warn the person utilizing the portable device of the detected dangerous situation;
   the dangerous situation being defined as a collision of the person (1) utilizing the portable device (10) with the at least one external system; and
   at least one vitality sensor which determines at least one vital sign of the person wearing the portable device, and a further dangerous situation arises when the at least one vital sign either reaches or exceeds a vital sign threshold, whereupon the alarm call is triggered.

13. The portable device according to claim 12, wherein the dangerous situation is detected based on a collision probability determined by the evaluation unit, the collision probability is based on the signals received from the communication device and the location data received from the position-determining system as well as at least one of a vehicle type, a vehicle size and a braking behavior of the at least one external system.

14. The portable device according to claim 13, wherein the alarm call is at least one vibration that is generated by the vibration generator, a duration of the vibration is based on a measure of the collision probability, and dormant periods between a plurality of vibrations are based on a distance between the portable device and the at least one external system.

15. The portable device according to claim 12, further comprising at least one movement sensor which measures movement values of the portable device, and the evaluation unit stores normal movement values for a plurality of movement situations, the evaluation unit compares the measured movement values to the normal movement values for a selected one of the plurality of movement situations, and the evaluating unit detecting another dangerous situation when the measured movement value is outside a range of the normal movement values for the selected one of the plurality of movement situations.

* * * * *